May 22, 1923.
J. V. ZUPNIK
1,455,981
LUBRICATING SYSTEM FOR ROLLER BEARINGS
Filed April 3, 1922
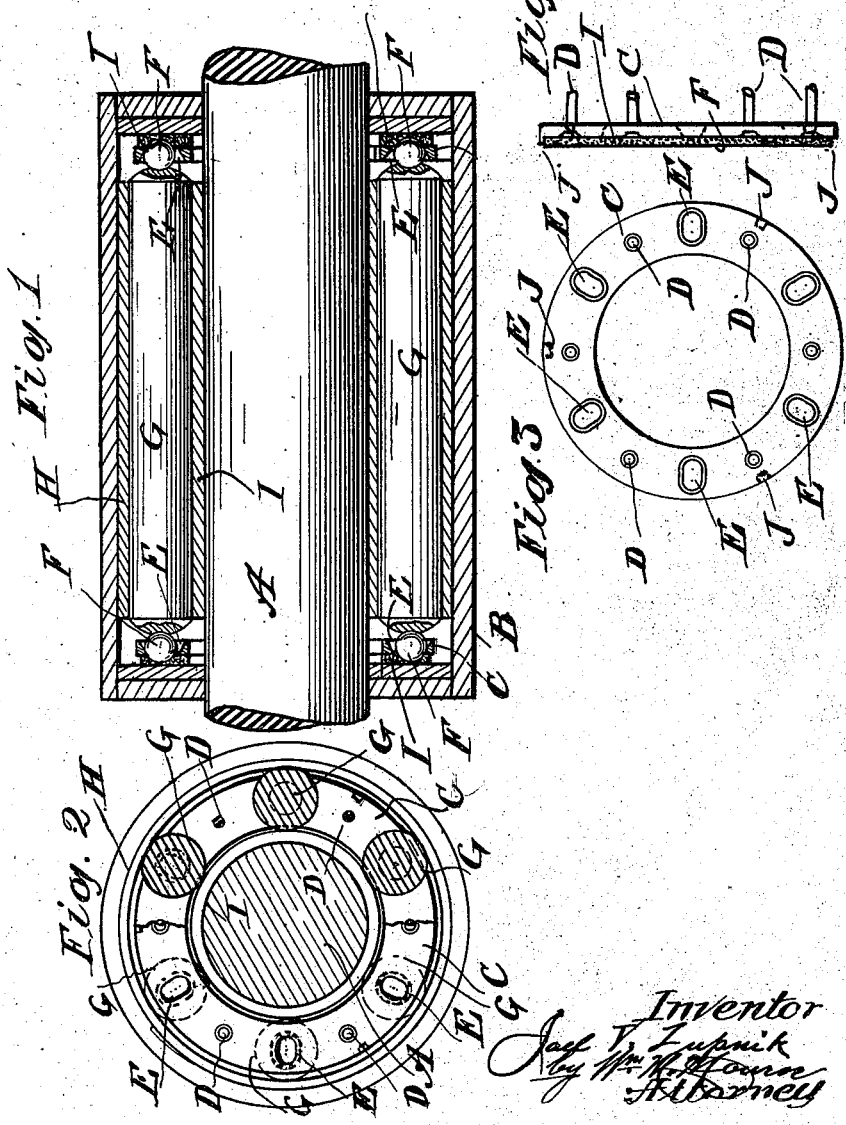

Patented May 22, 1923.

1,455,981

UNITED STATES PATENT OFFICE.

JOEL V. ZUPNIK, OF CLEVELAND, OHIO.

LUBRICATING SYSTEM FOR ROLLER BEARINGS.

Application filed April 3, 1922. Serial No. 549,281.

*To all whom it may concern:*

Be it known that I, JOEL V. ZUPNIK, a citizen of the United States, and resident of Cleveland, in the county of Cuyahoga and State of Ohio, have invented certain new and useful Improvements in Lubricating Systems for Roller Bearings, of which I hereby declare the following to be a full, clear, and exact description, such as will enable others skilled in the art to which it appertains to make and use the same.

The objects of the invention are to provide a novel form of construction for a combined roller and ball bearing and lubricating means therefor, and it relates to a type of bearing in which rolling contact is provided in all directions toward which pressure may be applied.

The device includes a cage composed of annular end plates and tie rods connecting the same, and rollers which are pivoted or journalled upon balls that are supported and guided in radial slots in the said annular end plates, the said slots having inclined sides upon which the aforesaid balls projecting through said annular end plates beyond their outer sides, find radial run ways, and support, and when additional longitudinal thrust must be provide for, additional thrust bearings may be provided, against which the balls find their bearings.

Also, washers of felt, or other oil absorbing material, are employed which are engaged by the projecting portions of the balls, which may be detachably secured to the end plates, and by means of which the oil is conveyed to lubricate the balls, and through the slotted openings to lubricate the rollers. The felt also tends to deaden the sound made when the rollers revolve rapidly. The rollers are enclosed between inner and outer sleeves.

The device can be applied to axle or shaft bearings, or bearings of any character where perfect lubrication and noiseless action are desired.

In this construction, all end thrusts are distributed between the projecting ends of the balls and thrust bearings, so that very little pressure is borne by the end plates of the cage, thus eliminating wearing upon the end plates, in which the balls are guided.

For this reason, the end plates of the cage may be made thinner and hardened or heat treated to enable them to endure all the pressure they may receive from hardened steel balls.

The slots are also countersunk, so as to give the balls as wide bearing surfaces and run ways as possible upon the inclined sides of the slots.

Also means may be employed to retain the felt washers upon the end plates.

The invention is hereinafter more fully described, shown in the accompanying drawings, and specifically pointed out in the claims.

In the accompanying drawings, Fig. 1 is a longitudinal section of a bearing; Fig. 2 is a transverse section thereof; Fig. 3 is a rear elevation of one of the ring plates and Fig. 4 is an edge view thereof.

In these views, A is a shaft, B a housing in which the shaft is enclosed. A cage is formed therein of spaced ring plates, C, C, attached together by tie rods, D, D, which pass through them.

The ring plates are radially slotted at E, E, and the sides are countersunk to provide reversely inclined thrust bearing surfaces for the balls, and balls, F, F, are guided in these slots.

These balls in turn form end bearings for the rollers, G, G, which are countersunk at their ends, and are supported upon balls in the opposite ring plates.

Outer and inner sleeves, H and I, enclose the rollers between them, and move as a unit with them and with the balls, if there should be any looseness of the fit between the outer sleeve and the housing.

The radial slots in the ring plates, in which the balls move, permit this action.

The slots are bevelled or countersunk on their edges to prevent the balls from falling out, but the slots permit the balls to project beyond the ring plates, where they can be supplied with lubricating oil from porous washers, I, I, or other suitable oiling means, which make direct contact with the balls.

These oiling washers are preferably mounted within keepers or inwardly turned lugs or flanges, J, J, upon the outer edges of the ring plates.

By means of these oiling washers, the oil is taken up by the balls and carried through the slots, thus lubricating the rollers and sleeves and all moving parts. The sides of the slots also form broad guiding surfaces for the balls, and are not easily worn, since the ring plates are preferably hardened.

Outer thrust rings or bearings, K, K, may be employed, if desired, in case the roller bearings are subjected to end thrust.

The inner sleeve may be keyed to the shaft, if desired.

Having described the invention, what I claim as new, and desire to secure by Letters Patent, is:

1. The combination with a shaft and housing, of a cage within said housing, comprising, spaced ring plates and connecting tie rods therefor, said ring plates provided with radial slots having bevelled edges, balls radially movable in said slots and projecting therethrough, rollers mounted upon opposed balls in said cage, inner and outer sleeves, enclosing said rollers, and porous washers adjacent to said ring plates in said housing, with which said protruding parts of said balls make contact.

2. The combination with a shaft and a housing thereon, of a cage mounted upon said shaft within said housing, said cage comprising radially slotted ring plates, and connecting tie rods therefor, balls guided in said slots in said ring plates, the sides of said slots being oppositely inclined to form bearing surfaces for said balls, rollers mounted upon opposed balls, and means for supplying lubrication to the outwardly projecting parts of said balls, and thrust plates in said housing.

In testimony whereof, I hereunto set my hand this 31 day of March, 1922.

JOEL V. ZUPNIK.

In presence of:
CHAS. C. GOLDMAN,
WM. M. MONROE.